(12) United States Patent
Fuwa et al.

(10) Patent No.: US 6,283,089 B1
(45) Date of Patent: Sep. 4, 2001

(54) DIRECT-INJECTION INTERNAL COMBUSTION ENGINE AND METHOD FOR CONTROLLING THE ENGINE

(75) Inventors: Naohide Fuwa, Susono; Takayuki Demura, Mishima; Junichi Kako, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/525,462

(22) Filed: Mar. 15, 2000

(30) Foreign Application Priority Data

Apr. 6, 1999 (JP) .................................................. 11-098761

(51) Int. Cl.⁷ .................................................. F02B 17/00
(52) U.S. Cl. .......................................... 123/295; 123/305
(58) Field of Search ...................................... 123/295, 305

(56) References Cited

U.S. PATENT DOCUMENTS

| | | | |
|---|---|---|---|
| 5,970,950 | * 10/1999 | Shimazu et al. | 123/305 |
| 5,996,552 | * 12/1999 | Iijima et al. | 123/305 |
| 6,062,191 | * 5/2000 | Ooba | 123/295 |
| 6,065,443 | * 5/2000 | Mizuno et al. | 123/295 |
| 6,073,606 | * 6/2000 | Shimuzu et al. | 123/295 |
| 6,085,720 | * 6/2000 | Klare et al. | 123/305 |
| 6,116,208 | * 9/2000 | Nishimura et al. | 123/295 |

FOREIGN PATENT DOCUMENTS

| | | |
|---|---|---|
| 0 849 452 A2 | 12/1997 | (DE) . |
| 0 898 069 A2 | 8/1998 | (DE) . |
| 197 27 385 A 1 | 1/1999 | (DE) . |
| 5-99020 | 4/1993 | (JP) . |

* cited by examiner

Primary Examiner—John Kwon
(74) Attorney, Agent, or Firm—Oliff & Berridge, PLC

(57) ABSTRACT

A direct-injection internal combustion engine can smoothly switch and transition between a first operation mode and a second operation mode according to an operating condition of the engine. An engine control amount in the first operation mode is calculated differently from an engine control amount in the second operation mode. However, even if the engine control amount requires correction only in the second operation mode, calculation of a correction amount is made during the first operation mode as well. During a transition from the first operation mode to the second operation mode, the correction amount calculated during the first operation mode is taken into account in calculating an engine control amount. As the correction amount is already available at the time of transition, a suitable engine control amount can be immediately obtained.

18 Claims, 7 Drawing Sheets

DIRECT-INJECTION INTERNAL COMBUSTION ENGINE AND METHOD FOR CONTROLLING THE ENGINE

INCORPORATION BY REFERENCE

The disclosure of Japanese Patent Application No. HEI 11-98761 filed on Apr. 6, 1999 including the specification, drawings and abstract is incorporated herein by reference in its entirety.

BACKGROUND OF THE INVENTION

1. Field of the Invention

The present invention relates to a direct-injection internal combustion engine and method for controlling the engine wherein stratified combustion is caused.

2. Description of the Related Art

For the purpose of improving a fuel consumption rate, there has been developed a direct-injection internal combustion engine wherein stratified combustion is caused. In the process of stratified combustion, a rich mixture and lean mixture are formed in a combustion chamber in a layered manner, and the rich mixture is first ignited so that the flames generated thereby burn the lean mixture. Thus, the mixture which is lean as a whole burns with the possibility of incomplete combustion or misfiring being removed. When stratified combustion is caused, fuel injection is carried out in a compression stroke. On the other hand, when homogeneous combustion for burning a stoichiometric mixture is caused, fuel injection is carried out in an intake stroke.

In this manner, the direct-injection internal combustion engine has mutually different operation modes, namely, stratified combustion and homogeneous combustion. Depending on which of these operation modes is selected, a load detecting parameter of an operating condition is detected either from an accelerator operation amount or from an amount relating to intake air, such as a flow rate, a negative pressure, a throttle opening degree or the like. In such circumstances, the control regarding a fuel injection amount and ignition timing and the control regarding an amount of intake air and EGR must be designed to differ from each other in responding performance (e.g. see Japanese Patent Application Laid-Open No. HEI 5-99020).

When one of the operation modes is selected, a fuel injection amount and a control amount for ignition timing are directly calculated using a load detecting parameter (without making any correction). When the other operation mode is selected, the calculation is made with a necessary correction made. Thus, the operation of the engine is optimized in each of the operation modes. However, when making a transition to the operation mode where a correction is made, an appropriate correction amount cannot be used immediately. For this reason, it is difficult to switch operation modes from one to the other smoothly.

SUMMARY OF THE INVENTION

The present invention has been made in view of the aforementioned problem. It is an object of the present invention to provide a direct-injection internal combustion engine wherein a suitable engine control amount including a correction amount can be obtained immediately at the time of a transition to the operation mode where a correction is made in calculating an engine control amount, by calculating a correction value for an engine control amount even when the engine is in the operation mode that does not require correction in calculating the engine control amount.

In order to achieve the above-stated object, according to the present invention, there is provided a direct-injection internal combustion engine wherein a first operation mode and a second operation mode are switched from one to the other according to an operating condition, comprising an accelerator operation amount detector that detects an accelerator operation amount, a parameter detector that detects a parameter relating to intake air, a controller that determines an engine control amount, and a calculator that calculates a correction amount corresponding to responding performance for a change in the engine control amount. The controller determines an engine control amount based on at least the accelerator operation amount when the engine is in the first operation mode and determines the engine control amount using at least the parameter relating to intake air of the engine and the correction amount when the engine is in the second operation mode.

In the aforementioned construction of the present invention, whether or not the operation mode of the engine requires making a correction in calculating an engine control amount, the correction value for the engine control amount can be calculated. Therefore, a suitable engine control amount including a correction amount can be obtained immediately at the time of a transition to the operation mode where a correction is made in calculating an engine control amount.

BRIEF DESCRIPTION OF THE DRAWINGS

The foregoing and further objects, features and advantages of the present invention will become apparent from the following description of a preferred embodiment with reference to the accompanying drawings, wherein.

DESCRIPTION OF PREFERRED EMBODIMENT

An embodiment of the present invention will be described hereinafter with reference to the drawings.

Figure 1:
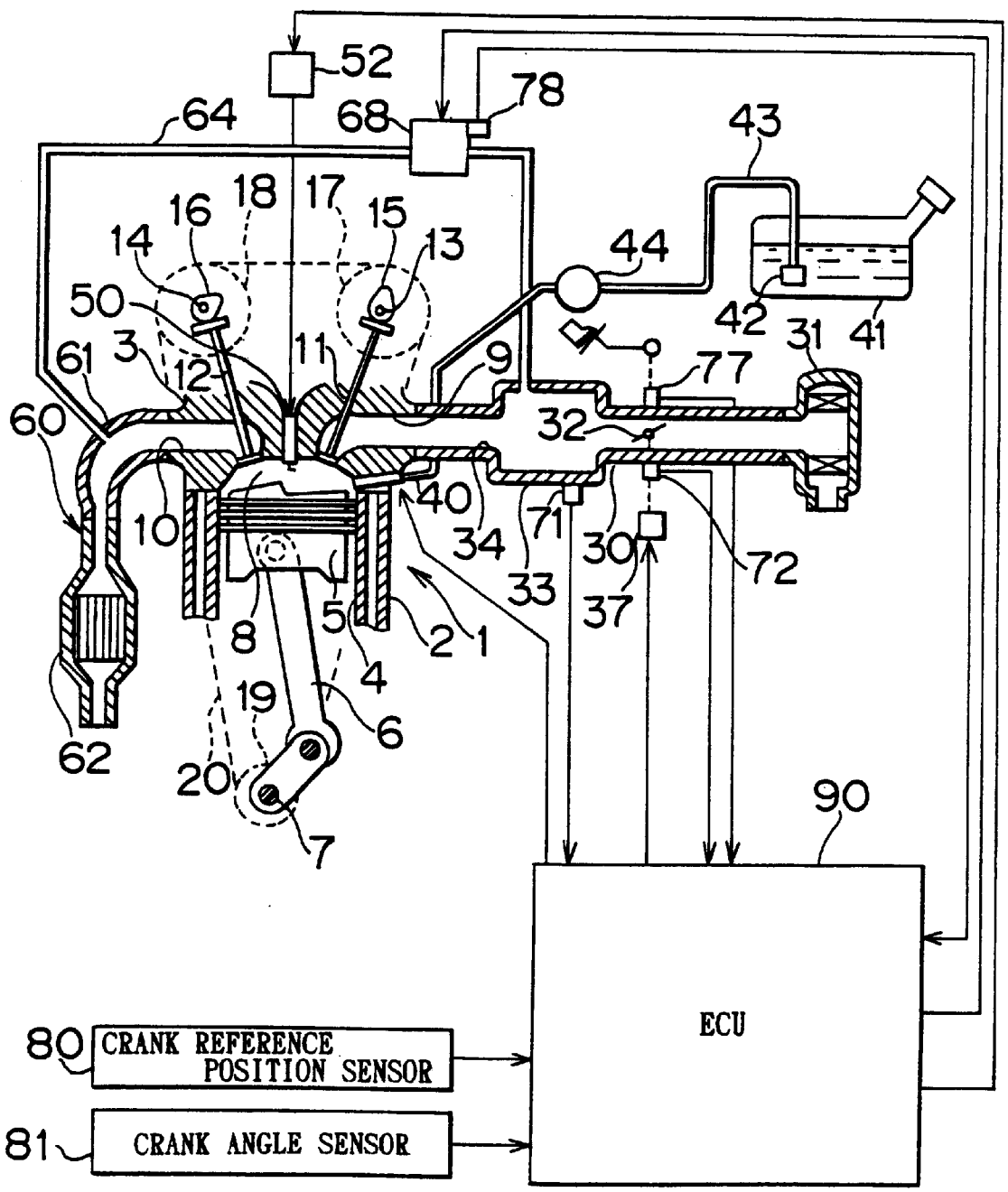
FIG. 1 is a general schematic view of a direct-injection internal combustion engine according to an embodiment of the present invention.

FIG. 1 is a general schematic view of a direct-injection internal combustion engine according to an embodiment of the present invention. An internal combustion engine 1 is an in-line multi-cylinder four-stroke-cycle reciprocating gasoline engine wherein homogeneous combustion and stratified combustion are caused. The engine 1 is provided with a cylinder block 2 and a cylinder head 3. A plurality of cylinders 4 are aligned in the cylinder block 2 in the direction of a thickness of the sheet. A piston 5 is reciprocally disposed in each of the cylinders 4. Each piston 5 is coupled to a common crank shaft 7 through a connecting rod 6. The connecting rod 6 converts reciprocal movement of each piston 5 into rotational movement of the crank shaft 7.

Between the cylinder block 2 and the cylinder head 3, there is a combustion chamber 8 located above each piston 5. The cylinder head 3 has an intake port 9 and an exhaust port 10 for communication between each combustion chamber 8 and both outer faces of the cylinder head 3. An intake valve 11 and an exhaust valve 12, which are designed to open and close the intake port 9 and the exhaust port 10, respectively, are supported by the cylinder head 3 such that they are capable of reciprocating in up-and-down directions. In the cylinder head 3, an intake-side cam shaft 13 and an exhaust-side cam shaft 14 are rotatably provided above the intake valve 11 and the exhaust valve 12, respectively. Cams 15, 16 for driving the valves 11, 12, respectively, are attached to the cam shafts 13, 14, respectively. Timing pulleys 17, 18, which are provided at ends of the cam shafts 13, 14 respectively, are coupled by a timing belt 20 to a timing pulley 19, which is provided at an end of the crank shaft 7.

An intake passage 30, which is provided with an air cleaner 31, a throttle valve 32, a surge tank 33, an intake manifold 34 and the like, is connected to the intake port 9. The air outside the engine 1 (outside air) sequentially passes through the air cleaner 31, the throttle valve 32, the surge tank 33 and the intake manifold 34 that are provided in the intake passage 30 and is introduced into the combustion chamber 8. The throttle valve 32 is an electronic throttle which is not mechanically directly coupled to an accelerator pedal in a driver's seat and driven by a throttle motor 37.

A fuel injection valve 40 for injecting fuel into each combustion chamber 8 is attached to the cylinder head 3. A fuel tank 41 is designed to store fuel, which is pumped up by a fuel pump 42, passes through a fuel line 43, is pressurized by a high-pressure pump 44 driven by the engine, and is supplied to the fuel injection valve 40. The fuel injected from the fuel injection valve 40 merges in the combustion chamber 8 with the air that is introduced into the combustion chamber 8 through the intake passage 30, the intake port 9 and the intake valve 11, thus forming a mixture. Injection is carried out in an intake stroke in the case of homogeneous combustion, whereas injection is carried out in a compression stroke in the case of stratified combustion.

An ignition plug 50 for igniting the mixture is attached to the cylinder head 3. An ignition coil 52 with a built-in igniter is provided separately in each cylinder 4 and coupled to the ignition plug 50. At the time of ignition, the igniter controls flow and blocking of a primary current in the ignition coil 52 of each cylinder that has received an ignition signal. In the case of homogeneous combustion, ignition is carried out after a homogeneous mixture has been formed in the combustion chamber 8 through injection in an intake stroke. In the case of stratified combustion, a large amount of fuel that has been injected in a compression stroke exists in the vicinity of the ignition plug 50, and ignition is carried out only when the mixture in that area is rich. Flames generated by this ignition burn the lean mixture existing in the peripheral area.

The burnt mixture is introduced as exhaust gas into the exhaust port 10 through the exhaust valve 12. An exhaust passage 60, which is provided with an exhaust manifold 61, a catalytic converter 62 and the like, is connected to the exhaust port 10. A three-way catalyst for simultaneously promoting oxidation of incompletely burnt substances such as hydrocarbon HC and carbon monoxide CO and reduction of nitrogen oxides NOx that are produced through reaction of the nitrogen in air with the remaining oxygen is accommodated in the catalytic converter 62. The exhaust gas is purified in the catalytic converter 62 and then discharged into the atmosphere.

In order to perform EGR (Exhaust Gas Recirculation) with a view to reducing the amount of NOx, the engine 1 has an EGR passage 64 for recirculating exhaust gas between the exhaust passage 60 and the intake passage 30 downstream of the throttle valve 32. The amount of EGR gas flowing through the EGR passage 64 is controlled by an EGR valve 68 that is provided therein.

Various sensors are attached to the engine 1. In the vicinity of the throttle valve 32 in the intake passage 30, a throttle opening degree sensor 72 for detecting a rotational angle of a shaft of the throttle valve 32 and an accelerator opening degree sensor 77 for detecting an accelerator operation amount (also referred to as an accelerator depression amount, an accelerator opening degree or the like) are provided. A vacuum sensor 71 for detecting a pressure in the surge tank 33 (an intake pipe negative pressure) is attached to the surge tank 33. An EGR valve opening degree sensor 78 for detecting an opening degree of the EGR valve 68 is attached thereto.

The cam shaft 13 is provided with a crank reference position sensor 80 that generates a reference position detecting pulse every time the crank shaft 7 rotates by 720° CA (crank angles). The crank shaft 7 is provided with a crank angle sensor 81 that generates a rotational speed detecting pulse every time the crank shaft 7 rotates by 30° CA. Every time a pulse signal of the crank angle sensor 81 is inputted to an electronic control unit (ECU) 90, an engine speed is calculated from a width of the pulse signal and stored into a built-in memory as engine speed data NE.

The ECU 90 is a microcomputer system for performing fuel injection control, ignition control, throttle control, EGR control and the like. The ECU 90, to which signals from various sensors are inputted, performs arithmetic processings according to programs and various maps stored in the memory and outputs control signals for various actuators based on the result of the arithmetic processings.

As described above, an operation mode for stratified combustion and an operation mode for homogeneous combustion are switched from one to the other in the engine 1 according to an operating condition thereof. In the stratified combustion operation mode, engine control amounts such as a fuel injection amount, an ignition timing and the like are calculated using an accelerator operation amount detected by the accelerator opening degree sensor 77 as a load detecting parameter. In the homogeneous combustion operation mode, engine control amounts such as a fuel injection amount, an ignition timing and the like are calculated using an intake pipe negative pressure detected by the vacuum sensor 71 as a load detecting parameter. Instead of the intake pipe negative pressure, it is also possible to use an amount relating to intake air such as a throttle opening degree, a flow rate of intake air or the like.

Figure 2:
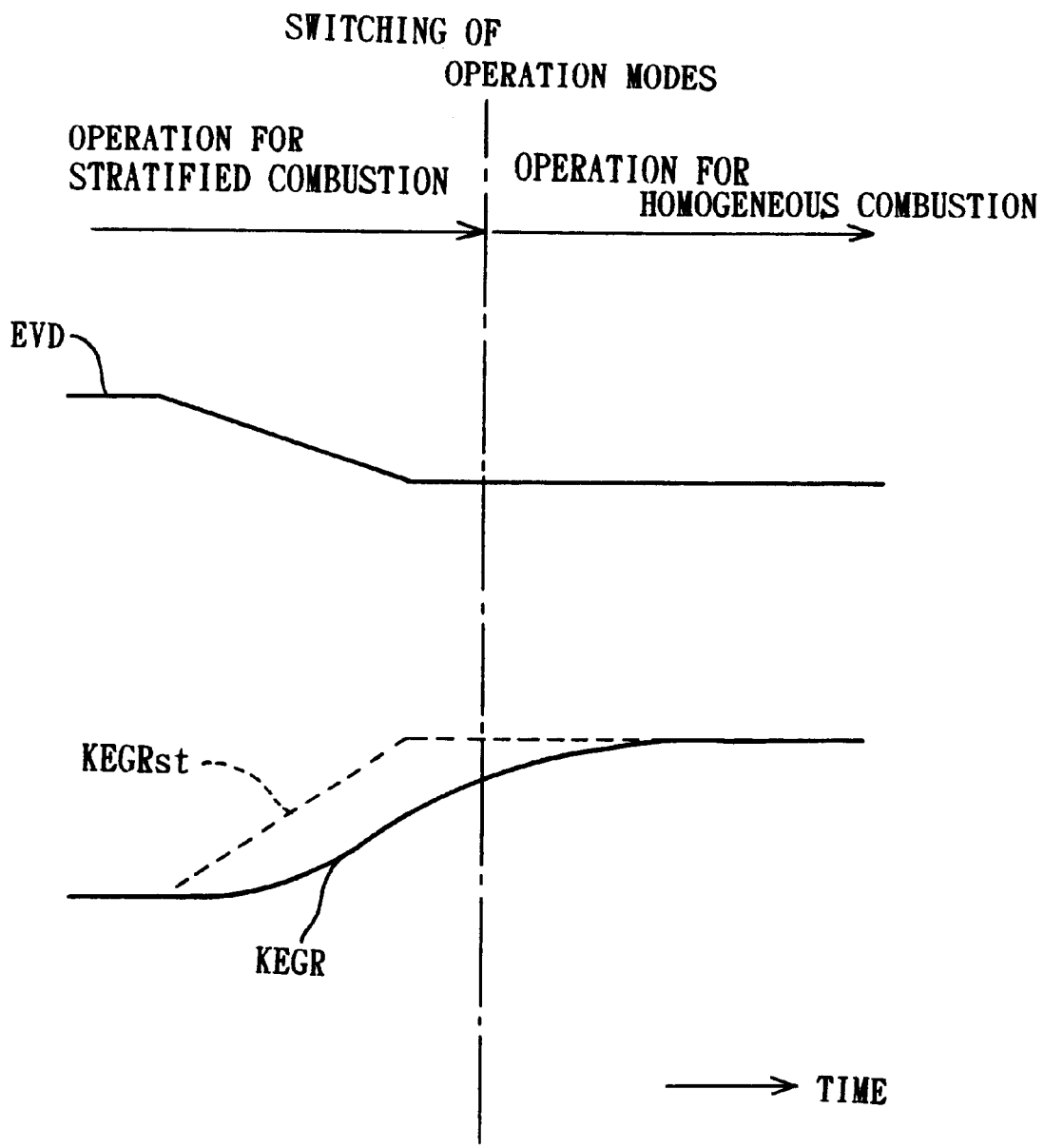
FIG. 2 shows how the opening degree of an EGR valve and the fuel injection amount correction factor change when operation modes are switched.

FIG. 2 illustrates a problem which is caused when operation modes are switched. In the stratified combustion operation mode, an EGR valve opening degree EVD is preliminarily determined based on an accelerator operation amount. In a map for determining engine control amounts such as a fuel injection amount, an ignition timing and the like from the accelerator operation amount, the effect (influence) of an EGR amount is preliminarily considered. Thus, when calculating engine control amounts such as a fuel injection amount, an ignition timing and the like through interpolation based on the map, there is no need to make a correction based on the EGR valve opening degree EVD.

On the other hand, in the homogeneous combustion operation mode, after engine control amounts have been calculated through interpolation with reference to the map based on an intake pipe negative pressure, it is necessary to make a correction based on the EGR valve opening degree EVD. If the EGR amount changes according to changes in EGR valve opening degree EVD, there is a response delay. If it is assumed that there is no response delay, the correction factor for correcting a fuel injection amount according to the EGR valve opening degree EVD is a correction factor KEGRst that is uniquely determined by the EGR valve opening degree EVD (i.e. a correction factor in a steady state). In fact, however, in a transitional state, it is necessary to use a correction factor KEGR that is obtained by smoothing KEGRst in view of response delay. That is, a correction amount corresponding to responding performance for changes needs to be added to the calculated engine control amount (the fuel injection amount in this instance).

As described above, the fuel injection amount correction factor KEGR based on the EGR valve opening degree EVD is required only in the homogeneous combustion operation mode. In a steady state, the correction factor KEGR coincides with KEGRst. However, in a transitional state, the correction factor KEGR is obtained by making smoothing calculation of KEGRst. Even if the smoothing calculation for obtaining the correction factor KEGR based on the EGR valve opening degree EVD is suddenly started at the time of a transition from the stratified combustion operation mode to the homogeneous combustion operation mode, the past history is not reflected. Hence, it is quite likely that the calculated value will deviate from a suitable value. Thus, according to the present invention, an engine control correction amount that is required only in the homogeneous combustion operation mode is calculated when the engine is in the stratified combustion operation mode. Thereby a suitable engine control amount is immediately obtained even at the time of a transition from the stratified combustion operation mode to the homogeneous combustion operation mode.

Figure 3:
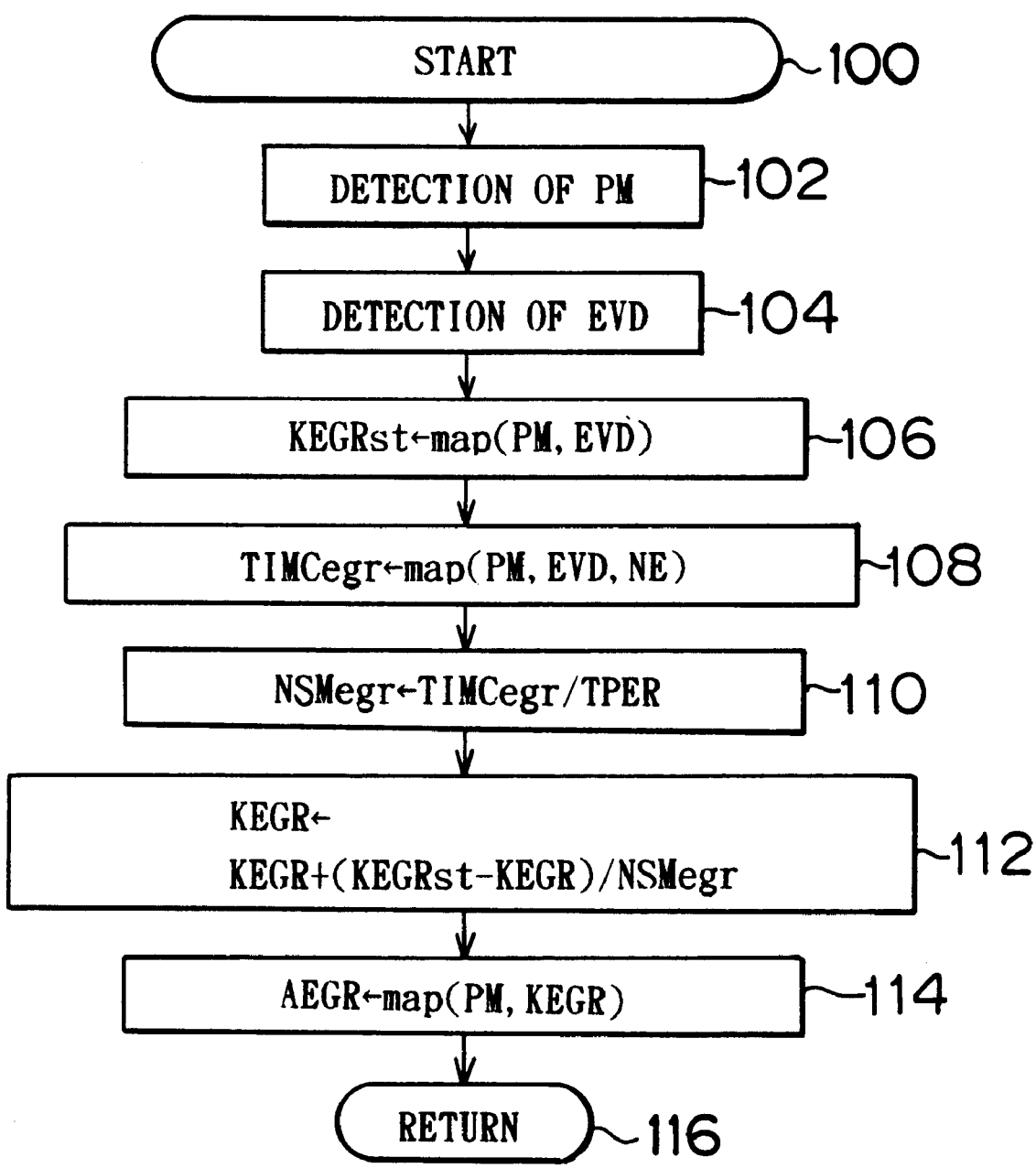
FIG. 3 is a flowchart showing a processing procedure of a routine for calculating a fuel injection amount correction factor KEGR and an ignition timing correction amount AEGR based on an opening degree of the EGR valve.
Figure 4:
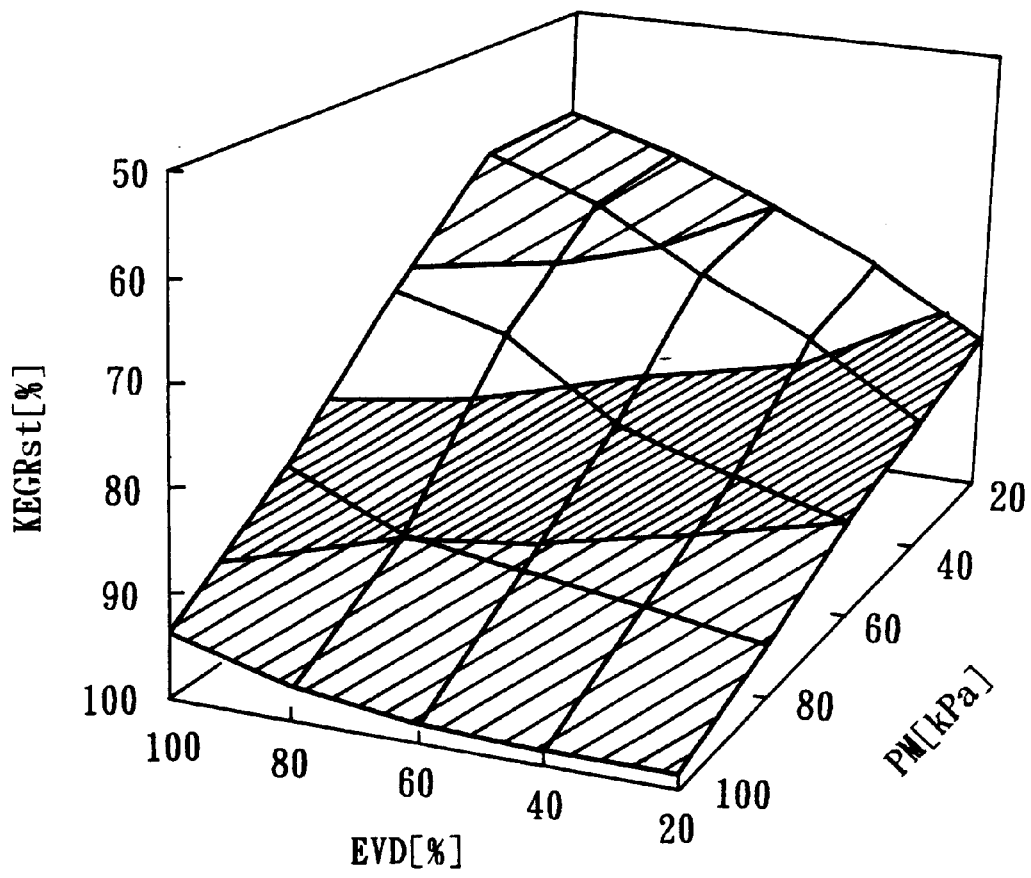
FIG. 4 is a map for calculating a steady-state fuel injection amount correction factor KEGRst from an intake pipe negative pressure PM and an EGR valve opening degree ECD.
Figure 5:
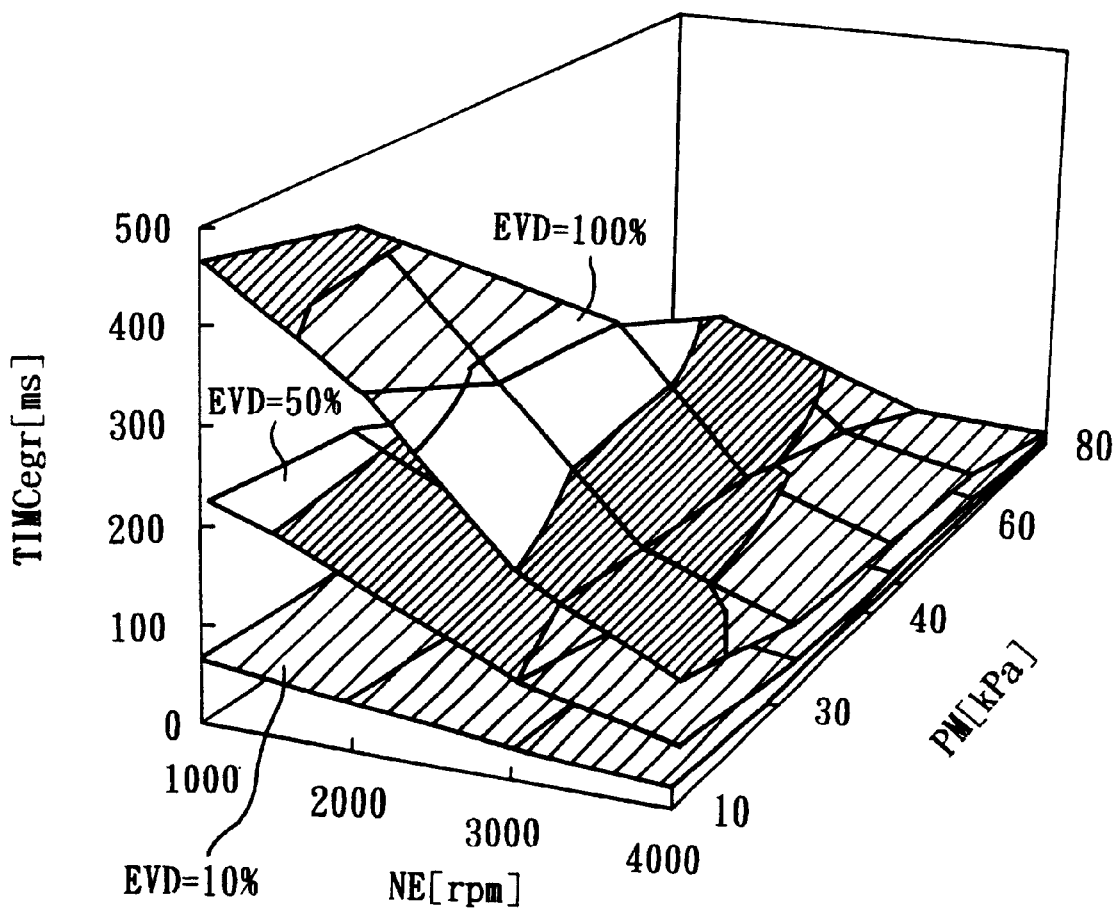
FIG. 5 is a map for calculating an EGR time constant TIMCegr from an intake pipe negative pressure PM, an EGR valve opening degree EVD and an engine speed NE.
Figure 6:
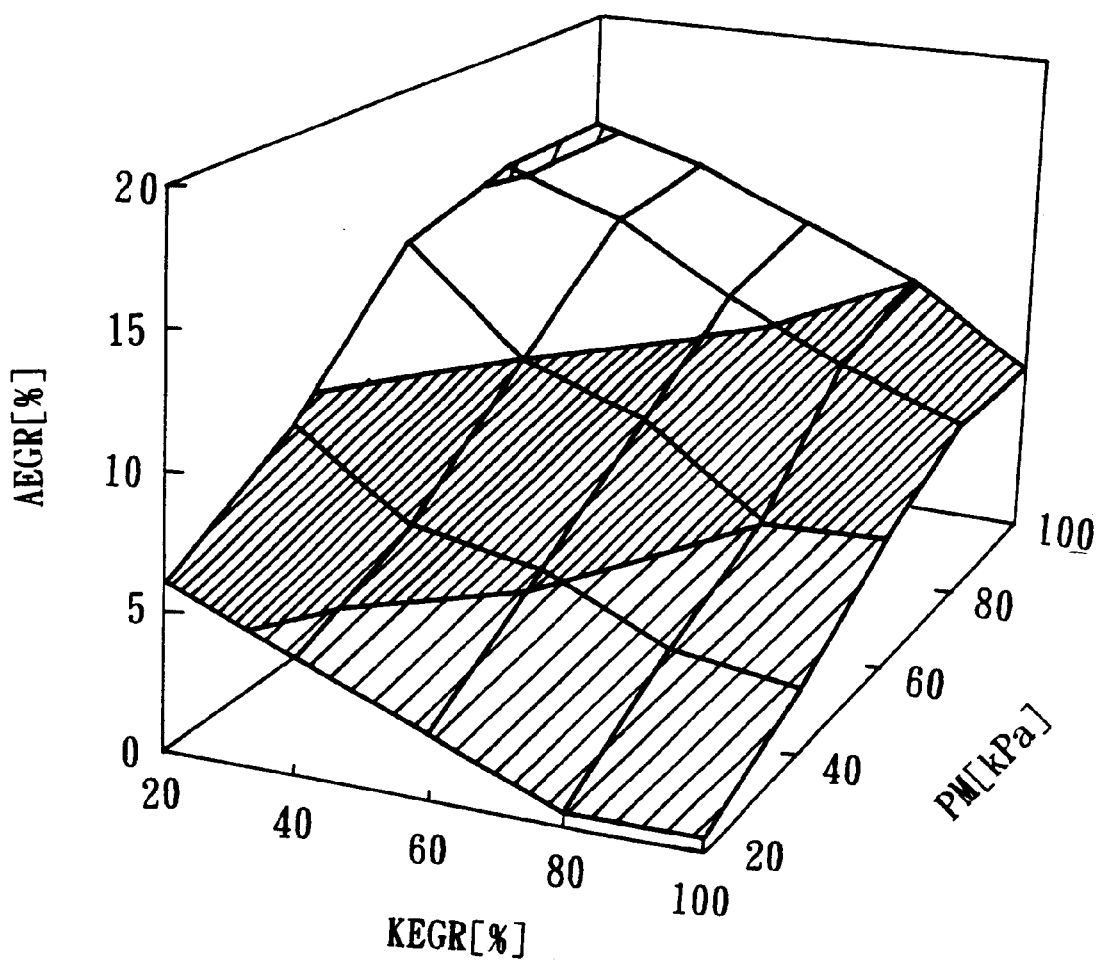
FIG. 6 is a map for calculating an ignition timing correction amount AEGR from an intake pipe negative pressure PM and a fuel injection amount correction factor KEGR.

FIG. 3 is a flowchart showing a routine for calculating a fuel injection amount correction factor KEGR and an ignition timing correction amount AEGR based on an EGR valve opening degree EVD. FIGS. 4, 5 and 6 are maps that are preliminarily stored in the memory for use in this routine. FIG. 4 is a map for calculating a steady-state fuel injection amount correction factor KEGRst from an intake pipe negative pressure PM and an EGR valve opening degree ECD. FIG. 5 is a map for calculating an EGR time constant TIMCegr from an intake pipe negative pressure PM, an EGR valve opening degree EVD and an engine speed NE. FIG. 6 is a map for calculating an ignition timing correction amount AEGR from an intake pipe negative pressure PM and a fuel injection amount correction factor KEGR.

The routine shown in FIG. 3 calculates values KEGR and AEGR and is carried out at intervals of a predetermined length of time regardless of an operation mode of the engine.

The process starts at step 100 and advances to step 102, where an intake pipe negative pressure PM is detected based on an output from the vacuum sensor 71. In step 104, an EGR valve opening degree EVD is detected based on an output from the EGR valve opening degree sensor 78. Then in step 106, a steady-state fuel injection amount correction factor KEGRst corresponding to the intake pipe negative pressure PM and the EGR valve opening degree EVD is calculated through interpolation with reference to the map shown in FIG. 4. According to the map in FIG. 4, the value of KEGRst approaches 100% in accordance with an increase in PM and a decrease in EVD.

Then in step 108, an EGR time constant corresponding to the intake pipe negative pressure PM, the EGR valve opening degree EVD and an engine speed NE is calculated through interpolation with reference to the map shown in FIG. 5. According to the map shown in FIG. 5, the value of TIMCegr increases in accordance with a decrease in PM, an increase in EVD and a decrease in NE.

Then in step 110, a number of times for smoothing KEGR NSMEGR is calculated by dividing the EGR time constant TIMCegr by a processing cycle TPER of the present routine. For example, if TIMCegr is equal to 160 ms and TPER is equal to 8 ms, NSMEGR is equal to 20.

Then in step 112, the fuel injection amount correction factor KEGR based on the EGR valve opening degree EVD is renewed according to the smoothing calculation shown below.

$$KEGR=KEGR+(KEGRst-KEGR)/NSMEGR=[(NSMEGR-1)\times KEGR+KEGRst]/NSMEGR$$

For example, if NSMEGR=20, a weighted average, which is obtained by weighting the value of KEGR calculated during the last implementation of the routine with 19 and the value of KEGRst with 1, is adopted.

In step 114, an ignition timing correction amount AEGR corresponding to the intake pipe negative pressure PM and the fuel injection amount correction factor KEGR is calculated through interpolation with reference to the map shown in FIG. 6. The process returns at step 116. The ignition timing correction amount AEGR represents a correction amount for advancing an ignition timing which is expressed as a crank angle prior to a compression top dead center. As shown in the map of FIG. 6, the value of AEGR increases in accordance with an increase in PM and a decrease in KEGR.

Figure 7:
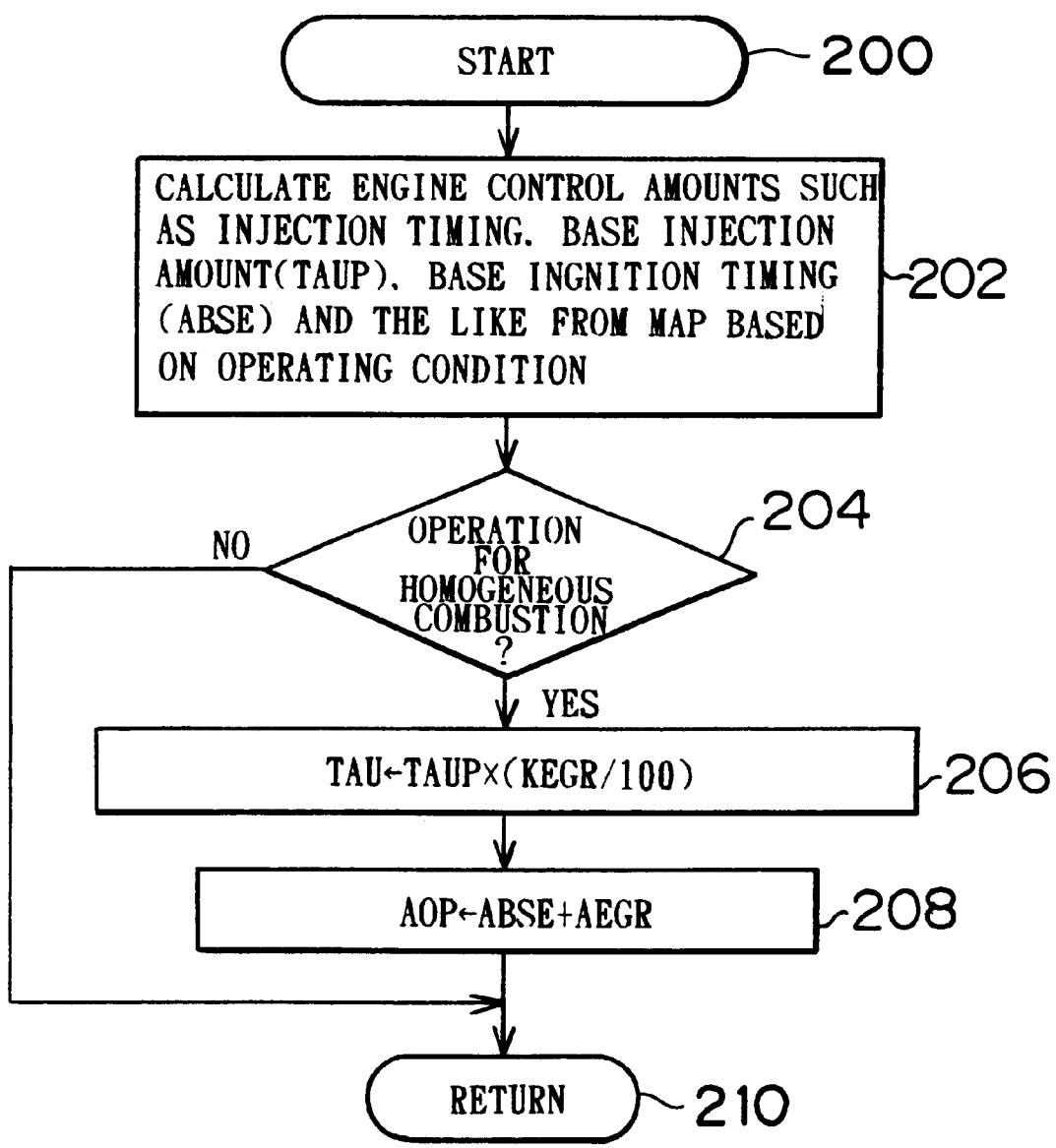
FIG. 7 is a flowchart showing a processing procedure of a routine for calculating engine control amounts.

FIG. 7 is a flowchart showing a processing procedure of a routine for calculating engine control amounts. This routine is carried out at intervals of a predetermined length of time. The process starts at step 200 and advances to step 202, where engine control amounts such as a fuel injection timing, a base fuel injection amount TAUP, a base ignition timing ABSE and the like are determined based on an operating condition. More specifically, an operation mode is first determined based on an operating condition of the engine. If the engine is in the stratified combustion operation mode, the respective control amounts are calculated from an accelerator operation amount and an engine speed through interpolation with reference to the predetermined map. If the engine is in the homogeneous combustion operation mode, the respective control amounts are calculated from an intake pipe negative pressure and an engine speed through interpolation with reference to the predetermined map.

It is determined in step 204 whether the engine is in the homogeneous combustion operation mode or in the stratified combustion operation mode. If the engine is in the stratified combustion operation mode, the present routine advances to step 210 and is terminated. If the engine is in the homogeneous combustion operation mode, the operation proceeds to steps 206 and 208.

In step 206, the base fuel injection amount TAUP is corrected using the correction factor (unit %) based on the EGR valve opening degree, whereby a final fuel injection amount TAU is determined.

Then in step 208, the base ignition timing ABSE is corrected using the ignition timing correction amount AEGR (the amount of advancement) based on the EGR valve opening degree, whereby a final ignition timing AOP is determined. After step 208, the process terminates at step 210.

Even when the engine is in the stratified combustion operation mode, the correction factor KEGR and the ignition timing correction amount AEGR that are used in steps 206 and 208 respectively are always calculated (with a predetermined cycle) in the routine shown in FIG. 3. Therefore, a calculation for suitable correction is guaranteed even immediately after a transition to the homogeneous combustion operation mode.

As described hitherto, according to the present invention, in a direct-injection internal combustion engine, suitable control amounts including correction amounts are immediately obtained at the time of a transition to an operation mode where a correction is made in calculating engine control amounts.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the present invention.

What is claimed is:

1. A direct-injection internal combustion engine switchable between a first operation mode and a second operation mode according to an operating condition, comprising:
    an accelerator operation amount detector that detects an accelerator operation amount;
    a parameter detector that detects a parameter relating to intake air;
    a controller that determines an engine control amount based on at least the accelerator operation amount when the engine is in the first operation mode and determines the engine control amount based on at least the parameter relating to intake air of the engine when the engine is in the second operation mode; and
    a calculator that calculates a correction amount corresponding to a responding performance for changing the engine control amount, wherein
    the calculator calculates the correction amount during operation of the engine in both of the first and second operating modes, and
    the controller determines the engine control amount using the correction amount when the engine is operated in the second operation mode.

2. The internal combustion engine according to claim 1, wherein
    the controller carries out fuel injection in a compression stroke of the internal combustion engine when the engine is in the first operation mode and carries out fuel injection in an intake stroke of the internal combustion engine when the engine is in the second operation mode.

3. The internal combustion engine according to claim 1, wherein
    the parameter relating to intake air is at least one of a flow rate of intake air, a negative pressure and a throttle opening degree.

4. The internal combustion engine according to claim 1, wherein the correction amount is based on an EGR valve opening degree.

5. The internal combustion engine according to claim 1, wherein the calculation involves a smoothing based on past values of the correction amount.

6. The internal combustion engine according to claim 5, wherein a suitable engine control amount is immediately obtained at a time of transition from the first operating mode to the second operating mode by using the calculated correction amount.

7. The internal combustion engine according to claim 6, wherein the calculated correction amount is based on a smoothing calculation of past values of the correction amount that occurred while the engine was operating under the first operating mode.

8. The internal combustion engine according to claim 1, wherein the control amount is a fuel injection quantity and the correction amount adjusts the fuel injection quantity.

9. The internal combustion engine according to claim 1, wherein the control amount is an engine ignition timing and the correction amount adjusts the ignition timing.

10. A method for controlling a direct-injection internal combustion engine to smoothly switch between a first operation mode and a second operation mode according to an operating condition, comprising:
    detecting an accelerator operation amount;
    detecting a parameter relating to intake air;
    determining an engine control amount based on at least the accelerator operation amount when the engine is in the first operation mode;
    determining the engine control amount based on at least the parameter relating to intake air of the engine when the engine is in the second operation mode;
    determining a correction amount corresponding to a responding performance for changing the engine control amount, the determining occurring during both the first and second operating modes; and
    changing the engine control amount using the correction amount when the engine is operated in the second operation mode.

11. The method according to claim 10, further comprising:
    injecting fuel in the combustion chamber of the engine during a compression stroke when the engine is in the first operation mode; and
    injecting fuel in the combustion chamber of the engine during an intake stroke when the engine is in the second operation mode.

12. The method according to claim 10, wherein
    the parameter relating to intake air is at least one of a flow rate of intake air, a negative pressure and a throttle opening degree.

13. The method according to claim 10, wherein the correction amount is determined based on an EGR valve opening degree.

14. The method according to claim 10, wherein the determining of a correction amount involves a smoothing based on past values of the correction amount.

15. The method according to claim 14, wherein a suitable engine control amount is immediately obtained at a time of transition from the first operating mode to the second operating mode by using the determined correction amount.

16. The method according to claim 15, wherein the determined correction amount is based on a smoothing calculation of past values of the correction amount that occurred while the engine was operating under the first operating mode.

17. The method according to claim 10, wherein the control amount is a fuel injection quantity and the correction amount adjusts the fuel injection quantity.

18. The method according to claim 10, wherein the control amount is an engine ignition timing and the correction amount adjusts the ignition timing.

* * * * *